United States Patent Office 3,188,321
Patented June 8, 1965

3,188,321
DIHYDRODIBENZOTHIAZEPINES
Harry L. Yale, New Brunswick, Francis A. Sowinski, Edison, and Jack Bernstein, New Brunswick, N.J., assignors to Olin Mathieson Chemical Corporation, New York, N.Y., a corporation of Virginia
No Drawing. Filed Aug. 8, 1962, Ser. No. 215,546
The portion of the term of the patent subsequent to Jan 1, 1980, has been disclaimed and dedicated
7 Claims. (Cl. 260—327)

This invention relates to new basically substituted dihydrodibenzothiazepines (and their salts) having valuable therapeutic properties, processes for the preparation thereof and new intermediates useful in such processes.

The therapeutically active compounds of this invention include dihydrodibenzothiazepines of the general formula:

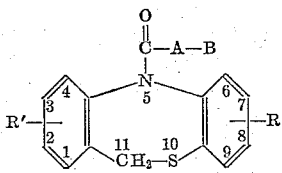

wherein A is a lower alkylene radical, B is a basic saturated nitrogen-containing radical of less than twelve carbon atoms, and R and R' are the same or different and represent hydrogen, halogen, lower alkyl, lower alkoxy, trifluoromethyl, trifluoromethylmercapto, trifluoromethoxy or N,N-dimethylaminosulfonyl. Among the suitable radicals represented by the symbol B are: amino; (lower alkyl)amino; di(lower alkyl)amino; (hydroxy-lower alkyl)amino; di(hydroxy-lower alkyl)amino; and basic saturated 5 to 7 membered N-heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2, 3 or 4-(lower alkyl)piperidino or 2,3 or 4-(N-lower alkyl)-piperidyl]; di(lower alkyl)piperidyl [e.g., 2,4-, 2,5-, or 3,5-di(lower alkyl)piperidino, or 2,3 or 4-(N-lower alkyl)-2,3 or 4-(lower alkyl)piperidyl]; (lower alkoxy)piperidyl; homopiperidino; pyrrolidyl; (lower alkyl)pyrrolidyl; di(lower alkyl)pyrrolidyl; (lower alkoxy)pyrrolidyl, morpholinyl [i.e., morpholino, 2-morpholinyl and 3-morpholinyl]; (lower alkyl) morpholinyl; di(lower alkyl)morpholinyl; (lower alkoxy) morpholinyl; thiamorpholinyl; (lower alkyl)thiamorpholinyl; di(lower alkyl) thiamorpholinyl; (lower alkoxy)thiamorpholinyl; piperazyl; (lower alkyl)piperazyl (e.g., $N^4$-methylpiperazino); di(lower alkyl) piperazyl; (lower alkoxy)piperazyl; (hydroxy-lower alkyl)piperazyl [e.g., $N^4$-(2-hydroxyethyl)piperazino]; (lower alkanoyloxyalkyl) piperazyl [e.g., $N^4$-(2-acetoxyethyl)piperazino]; (hydroxy-lower alkoxy-lower alkyl)piperazyl [e.g., $N^4$-(2-hydroxyethoxyethyl) piperazino]; (carbo-lower alkoxy)piperazyl [e.g., $N^4$-(2-carbomethoxy, carboethoxy, or carbopropoxy)piperazino], and N-homopiperazino. The terms "lower alkyl," "lower alkoxy," and "lower alkylene," as employed herein, include both straight and branched chain radicals of less than eight carbon atoms. The particularly preferred compounds are those wherein A is a lower alkylene radical of two to three carbon atoms (i.e., ethylene, trimethylene-1,3 and propylene-1,2); B represents a di(lower alkyl)amino radical, an $N^4$-(lower alkyl) piperazino radical, an $N^4$-(2-hydroxyethyl)piperazino radical, or an $N^4$-(2-acetoxyethyl)piperazino radical, and R and R' are hydrogen.

As to salts of the dihydrodibenzothiazepines, those coming with the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The compounds of this invention are therapeutically active compounds which are utilizable both as ataractic agents, and thus may be used in the treatment of depressed psychotic states, and as antihistamines. For these purposes they may be administered orally or parenterally in conventional dosage forms such as tablets, capsules, injectables or the like by incorporating the appropriate dose of the compound with carriers according to accepted pharmaceutical practice.

The compounds of this invention are prepared by the process of this invention with is shown in the following equation, wherein R, R', A and B are as hereinbefore defined:

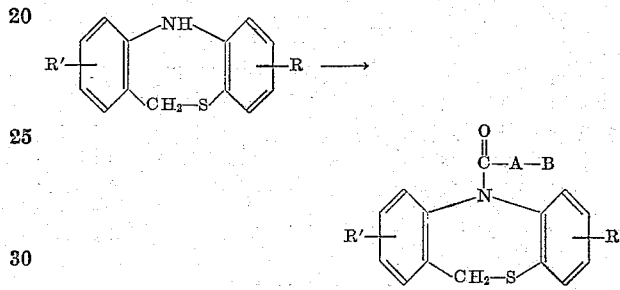

Suitable starting materials for the process of this invention can be prepared as disclosed in our U.S. patent application, Serial No. 215,547, filed on even date herewith. These starting materials are treated with a basically substituted lower alkanoyl halide of the formula: B—A—CO halide, wherein B and A are as hereinbefore defined, the reaction preferably being conducted in the presence of a basic condensation reagent, such as sodium hydride, to yield the final products of this invention. The same compounds can alternatively be prepared in two steps, by first reacting with a halo(lower alkanoyl) halide of the formula: (halo)—A—CO halide and then with a base of the formula: BH. To prepare the acid-addition salts, the resulting base is treated with the desired acid in the usual manner.

The following examples illustrate the invention (all temperatures being in centigrade).

EXAMPLE 1

2-dimethylaminoethyl 5,11-dihydrodibenzo[b,e]-[1,4]thiazepin-5-yl ketone (a) PREPARATION OF 2-CHLOROETHYL 5-11-DIHYDRODIBENZO[b,e][1,4]THIAZEPIN-5-YL KETONE A mixture of 10.65 g. of 5,11-dihydrodibenzo[b,e]-[1,4]thiazepine, 11.7 g. of β-chloropropionyl chloride and 150 ml. of dry toluene is refluxed for four hours, treated with Darco, filtered, and the filtrate concentrated to dryness to give the product.

(b) PREPARATION OF 2-DIMETHYLAMINOETHYL 5,11-DIHYDRODIBENZO[b,e][1,4]THIAZEPIN-5-YL KETONE

A mixture of 15.2 g. of 2-chloroethyl 5,11-dihydrodibenzo [b,e][1,4]thiazepin-5-yl ketone, 20.0 g. of anhydrous dimethylamine and 50 ml. of dry toluene is heated at 60° for 24 hours. The reaction mixture is cooled, filtered and the filtrate is concentrated to dryness. The residual material is recrystallized from diisopropyl ether to give 2-dimethylaminoethyl 5,11-dihydrodibenzo[b,e]-[1,4]thiazepine-5-yl ketone.

EXAMPLE 2

*2-diethylaminoethyl 5,11-dihydrodibenzo[b,e][1,4]thiazepin-5-yl ketone*

Following the procedure of Example 1 but substituting an equivalent amount of diethylamine for the dimethylamine in step (b), 2-diethylaminoethyl 5,11-dihydrodibenzo[b,e][1,4]thiazepin-5-yl ketone is obtained.

EXAMPLE 3

*2-dimethylaminoethyl 5,11-dihydrodibenzo[b,e]-[1,4]thiazepin-5-yl ketone hydrochloride*

To a solution of 5.92 g. of 2-dimethylaminoethyl-5,11-dihydrodibenzo[b,e][1,4]thiazepin-5-yl ketone in 25 ml. of anydrous ether is added 0.75 g. of hydrogen chloride in 10 ml. of anhydrous ether. The precipitated solid is filtered, dried and recrystallized from acetonitrile-ether to give 2-dimethylaminoethyl 5,11-dihydrodibenzo[b,e]-[1,4]thiazepin-5-yl ketone hydrochloride.

EXAMPLE 4

*2-dimethylaminoethyl 3-chloro-5,11-dihydrodibenzo[b,e][1,4]thiazepin-5-yl ketone*

Following the procedure of Example 1, but substituting an equivalent amount of 3-chloro-5,11-dihydrodibenzo-[b,e][1,4]thiazepine for the 5,11-dihydrodibenzo[b,e]-[1,4]thiazepine in step (a), 2-dimethylaminoethyl 3- chloro-5,11-dihydrodibenzo[b,e][1,4]thiazepin-5-yl ketone is obtained.

EXAMPLE 5

*2-dimethylaminoethyl 3-(trifluoromethyl)-5,11-dihydrodibenzo[b,e][1,4]thiazepin-5-yl ketone*

Following the procedure of Example 1, but substituting an equivalent amount of 3-(trifluoromethyl)-5,11-dihydrodibenzo[b,e][1,4]thiazepine for the 5,11-dihydrodibenzo[b,e][1,4]thiazepine in step (a), 2-dimethylaminoethyl 3-(trifluoromethyl)-5,11-dihydrodibenzo[b,e][1,4]-thiazepin-5-yl ketone is obtained.

Similarly, by substituting an equivalent amount of 3-(trifluoromethoxy) - 5,11 - dihydrodibenzo[b,e][1,4]thiazepine, 3-(trifluoromethylmercapto)-5,11-dihydrodibenzo[b,e][1,4]thiazepine or 3-(N,N-dimethylaminosulfonyl)-5,11-dihydrodibenzo[b,e][1,4]thiazepine for the 5,11-dihydrodibenzo[b,e][1,4]thiazepine in step (a), Example 1, 2-dimethylaminoethyl 3-(trifluoromethoxy)-5,11-dihydrodibenzo[b,e][1,4]thiazepin - 5 - yl ketone, 2-dimethylaminoethyl 3-(trifluoromethylmercapto)-5,11-dihydrodibenzo[b,e][1,4]thiazepin-5-yl and 2-dimethylaminoethyl 3-(N,N - dimethylamino sulfonyl)-5,11-dihydrodibenzo-[b,e][1,4]thiazepin-5-yl are prepared, respectively.

EXAMPLE 6

*2-dimethylaminoethyl 7-methyl-5,11-dihydrodibenzo[b,e][1,4]thiazepin-5-yl ketone*

Following the procedure of Example 1, but substituting an equivalent amount of 7-methyl-5,11-dihydrodibenzo[b,e][1,4]thiazepine for the 5,11 dihydrodibenzo[b,e]-[1,4]thiazepine in step (a), 2-dimethylaminoethyl yl-5,11-dihydrodibenzo[b,e][1,4]thiazepin-5-yl ketone is obtained.

EXAMPLE 7

*2-dimethylaminoethyl 3,7-dichloro-5,11-dihydrodibenzo[b,e][1,4]thiazepin-5-yl ketone*

Following the procedure of Example 1, but substituting an equivalent amount of 3,7-dichloro-5,11-dihydrodibenzo[b,e][1,4]thiazepine for the 5,11-dihydrodibenzo[b,e][1,4]thiazepine in step (a), 2-dimethylaminoethyl 3,7 - dichloro - 5,11-dihydrodibenzo[b,e][1,4]thiazepin-5-yl-ketone is obtained.

EXAMPLE 8

*Dimethylaminomethyl 5,11-dihydrodibenzo[b,e]-[1,4]thiazepin-5-yl ketone*

Following the procedure of Example 1, but substituting an equivalent amount of chloroacetyl chloride for the β-chloropropionyl chloride in step (a), dimethylaminomethyl - 5,11 - dihydrodibenzo[b,e][1,4]thiazepin-5-yl ketone is obtained.

EXAMPLE 9

*2-($N^4$-methylpiperazino)ethyl 5,11-dihydrodibenzo[b,e][1,4]thiazepin-5-yl ketone*

Following the procedure of Example 1, but substituting an equivalent amount of N-methylpiperazine for the dimethylamine in step (b), 2-($N^4$-methylpiperazino)ethyl 5,11-dihydrodibenzo[b,e][1,4]thiazepin-5-yl ketone is obtained.

Similarly, by substituting an equivalent amount of N-(2-hydroxyethyl)piperazine, N-(2-acetoxyethyl)piperazine, or N-(2-hydroxyethoxyethyl)piperizine for the dimethylamine in step (b) of Example 1, 2-[$N^4$-(2-hydroxyethyl)-piperazino]ethyl 5,11-dihydrodibenzo[b,e][1,4]thiazepin-5-yl ketone, 2-[$N^4$-(2-acetoxyethyl)piperazino]ethyl 5,11-dihydrodibenzo[b,e][1,4]thiazepin-5-yl ketone, and 2-[$N^4$ - (2-hydroxyethoxyethyl)piperazino]ethyl 5,11-dihydrodibenzo[b,e][1,4]thiazepin-5-yl ketone are obtained respectively.

EXAMPLE 10

*2-dimethylaminoethyl 7-chloro-5,11-dihydrodibenzo[b,e][1,4]thiazepin-5-yl ketone*

Following the procedure of Example 1, step (a), but substituting 12.4 g. of 7-chloro-5,11-dihydrodibenzo[b,e][1,4]thiazepine for the 5,11-dihydrodibenzo[b,e][1,4] thiazepine, there is obtained 2-chloroethyl 7-chloro-5,11-dihydrodibenzo[b,e][1,4]thiazepin-5-yl ketone. Following the procedure of Example 1, step (b), but substituting 17.0 g. of the 2-chloroethyl 7-chloro-5,11-dihydrodibenzo[b,e][1,4]thiazepin-5-yl ketone for the 2-chloroethyl-5,11-dihydrodibenzo[b,e][1,4]thiazepin-5-yl ketone, there is obtained 2-dimethylaminoethyl 7-chloro-5,11-dihydrodibenzo[b,e][1,4]thiazepin-5-yl ketone.

EXAMPLE 11

*2-piperidinoethyl 7-(trifluoromethyl)-5,11-dihydrodibenzo[b,e][1,4]thiazepin-5-yl ketone*

Following the procedure of Example 1, step (a), but substituting 14.1 g. of 7-(trifluoromethyl)-5,11-dihydrodibenzo[b,e][1,4]thiazepine for the 5,11-dihydrodibenzo[b,e][1,4]thiazepine there is obtained 2-chloroethyl 7-(trifluoromethyl) - 5,11-dihydrodibenzo[b,e][1,4]thiazepin-5-yl ketone. Following the procedure of Example 1, step (b), but substituting 18.6 g. of 2-chloroethyl 7-(trifluoromethyl) - 5,11-dihydrodibenzo[b,e][1,4]thiazepin-5-yl ketone for the 2-chloroethyl 6,11-dihydrobenzo[b,e][1,4]thiazepin-5-yl ketone and 8.5 g. of anhydrous piperidine for the dimethylamine, there is obtained 2-piperidinoethyl 7-(trifluoromethyl)-5,11-dihydrodibenzo[b,e][1,4]thiazepin-5-yl ketone.

EXAMPLE 12

*2-dimethylaminoethyl 7-ethoxy-5,11-dihydrodibenzo[b,e][1,4]thiazepine*

Following the procedure of Example 1, but substituting an equivalent amount of 7-ethoxy-5,11-dihydrodibenzo[b,e][1,4]thiazepine for the 5,11-dihydrodibenzo[b,e]

[1,4]thiazepine in step (a), 2-dimethylaminoethyl 7-ethoxy-5,11-dihydrodibenzo[b,e][1,4]thiazepine is obtained.

This invention may be variously otherwise embodied within the scope of the appended claims.

What is claimed is:

1. A compound selected from the group consisting of bases of the formula

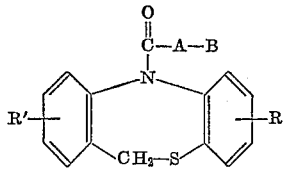

wherein A is lower alkylene, B is a basic saturated nitrogen-containing radical of less than twelve carbon atoms, and R and R' are each selected from the group consisting of hydrogen, halogen, lower alkyl, lower alkoxy, trifluoromethyl, trifluoromethylmercapto, trifluoromethoxy and N,N-dimethylaminosulfonyl and non-toxic acid-addition salts thereof.

2. Di(lower alkyl)amino(lower alkyl)5,11-dihydrodibenzo[b,e][1,4]thiazepin-5-yl ketone.

3. A non-toxic acid-addition salt of the compound of claim 2.

4. 2 - dimethylaminoethyl 5,11 - dihydrodibenzo[b,e][1,4]thiazepin-5-yl ketone.

5. A compound of the formula

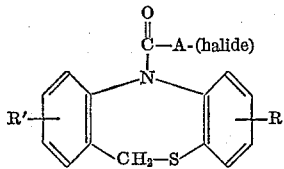

wherein A is lower alkylene and R and R' are each selected from the group consisting of hydrogen, halogen, lower alkyl, lower alkoxy, trifluoromethyl, trifluoromethylmercapto, trifluoromethoxy and N,N-dimethylaminosulfonyl.

6. Chloro(lower alkyl)5,11-dihydrodibenzo[b,e][1,4]thiazepin-5-yl ketone.

7. 2 - chloroethyl 5,11-dihydrodibenzo[b,e][1,4]thiazepin-5-yl ketone.

References Cited by the Examiner

UNITED STATES PATENTS

| | | | |
|---|---|---|---|
| 2,485,212 | 10/49 | Miescher et al. | 260—243 |
| 2,687,414 | 8/54 | Cusic | 260—243 |
| 3,071,596 | 1/63 | Yale et al. | 260—333 |

OTHER REFERENCES

Hromatka et al.: Monatsh. für Chemie, vol. 88 (1957), pages 64–71.

WALTER A. MODANCE, *Primary Examiner.*

NICHOLAS S. RIZZO, *Examiner.*